United States Patent [19]

Moss et al.

[11] 3,873,023

[45] Mar. 25, 1975

[54] APPARATUS FOR AND METHOD OF SPRAYING PLURAL COMPONENT MATERIALS

[75] Inventors: Albert H. Moss, Indianapolis, Ind.; Richard O. Probst, Sun Valley, Calif.

[73] Assignee: Ransburg Corporation, Indianapolis, Ind.

[22] Filed: Jan. 7, 1974

[21] Appl. No.: 431,201

Related U.S. Application Data

[63] Continuation-in-part of Ser. No. 290,210, Sept. 18, 1972, abandoned.

[52] U.S. Cl. ............................ 239/3, 239/9, 239/15, 239/112, 239/336, 239/414
[51] Int. Cl. ........................ A01g 23/10, B05b 5/02
[58] Field of Search ........... 239/304, 336, 112, 294, 239/113, 366, 368, 369, 9, 427, 427.3, 427.5, 414, 412, 415, 3, 15

[56] References Cited
UNITED STATES PATENTS

| | | | |
|---|---|---|---|
| 2,504,117 | 4/1950 | Downs | 239/291 |
| 3,176,922 | 4/1965 | Decker | 239/304 |
| 3,229,911 | 1/1966 | Carlson et al. | 239/112 |
| 3,263,928 | 8/1966 | Gusmer | 239/414 |
| 3,690,556 | 9/1972 | McCain | 239/412 |

*Primary Examiner*—Lloyd L. King
*Attorney, Agent, or Firm*—Merrill N. Johnson; David H. Badger

[57] ABSTRACT

A compressed air gun and a method of spraying plural component coating materials so as to provide an article with a substantially uniform, continuous thin film about one to two mils thick. The gun includes means for rotating about its axis a chamber in which the components of the coating material are mixed and ejected from a position where the components are introduced to the chamber to a position where the introduction of such components is terminated, means for forming the material ejected from the apparatus into a spray of the type necessary to provide the substantially uniform, continuous thin film, and means for purging and atomizing the residue of the material from the mixing chamber by a flow of compressed air therethrough immediately following the termination of the flow of components into the chamber.

15 Claims, 5 Drawing Figures

APPARATUS FOR AND METHOD OF SPRAYING PLURAL COMPONENT MATERIALS

This patent application is a continuation-in-part of U.S. Pat. application Ser. No. 290,210, filed Sept. 18, 1972, now abandoned.

The present invention relates to apparatus for and a method of spraying a plural component material. Use of the apparatus and method of this invention with a catalyzed, plural component material will reduce pollution of the atmosphere with the solvent vapors associated with conventional liquid paints and either eliminate or minimize the curing of spray coated articles at elevated temperatures for long periods of time. With this invention an article can be provided with a uniform and substantially continuous film about one to two mils thick using plural component materials that are mixed immediately prior to their atomization.

The assembly line production of motor cars, refrigerators, sewing machines, bicycles and other mass produced articles has traditionally relied upon spray painting to give the required smooth, decorative and protective finish these articles require.

Until about 1950 the almost universally used tools for spray painting articles were an external mix compressed air spray gun and a high temperature bake oven. Paint, a mixture of pigments and resins suspended in a volatile liquid vehicle (usually a hydrocarbon solvent), is delivered to an all-metal spray gun under a pressure of a few pounds per square inch and forced out a small cylindrical orifice at the front of the gun. This small cylindrical stream of paint is immediately hit by a blast of air compressed under pressures of from 10 to 100 pounds per square inch. The compressed air is fed through a separate supply line to the spray gun and issues from the gun through an annular orifice surrounding the liquid orifice and also from a number of adjacent air orifices. The jets of compressed air atomize the liquid paint issuing from the liquid orifice into a spray of more or less uniformly small droplets and shape the spray of droplets into elliptical or fan-shaped spray which, by virtue of the forward velocity of the compressed air, is projected toward and deposited onto the articles to be painted. By manual or automated manipulation of the spray gun, a relatively smooth and substantially continuous liquid film of paint is built up over the surface of the articles as the articles are conveyed through the spray area.

The freshly painted articles are moved by the conveyor a short distance beyond the spray area to a bake oven. The distance from the spray area to the bake oven is called the flashoff area where a portion of the solvent in the liquid paint film volatilizes into the atmosphere. The conveyor then moves the articles into a bake oven where the painted articles are raised to a temperature ranging from 350°F to 500°F or more for a period ranging from 10 to 30 minutes or more. Baking the paint is required to evaporate the remainder of the solvent in the paint film and promote chemical changes so as to provide the surface of the articles with a hard, smooth, and substantially continuous cosmetic dry paint film.

Although the combination of spray painting and high temperature baking produces a desirable paint film, the conventional air spray gun has a number of serious disvantages. A significant number of the paint droplets are driven past the articles by the compressed air and wasted as overspray. To combat the overspray problem, expensive filters and other overspray collection equipment are necessary. Evaporation of the solvents into the atmosphere not only presents a health hazard to spray painters, but contributes materially to pollution of the atmosphere. Moreover, the elevated temperatures required in the bake oven to cure the liquid paint contribute significantly to the cost of spray painting and consume large quantities of natural gas or other scarce energy sources. Likewise, the bake oven with its elaborate devices for maintaining ovens at precise temperatures are expensive to build and maintain. They also occupy considerable plant floor space to accommodate the articles while continuously moving on the conveyor for periods of from 10 to 30 minutes or more.

Beginning in the 1950's four successive technical advances eroded the position of the external mix, compressed air spray gun in industrial painting. These advances are electrostatic spray painting, airless spray painting, electrophoretic painting and powder spray painting.

In electrostatic spray painting, an electrostatic charge is put onto the paint particles so that the charged particles are attracted to and deposited onto the articles by electrostatic forces. While the original form of electrostatic painting, the "Ransburg No. 1 Process," retained the metal air spray gun, subsequent improved forms of electrostatic spray painting eliminated the metal air spray gun. Electrostatic spray painting significantly reduced overspray, resulting in great economic savings. Further, the reduction in overspray associated with electrostatic spray painting decreased the health hazards and the amount of overspray collection equipment needed.

Likewise, airless spray painting also reduced overspray. By forcing the paint under high pressures of many hundreds of pounds per square inch through the small orifice of a specially designed nozzle, the paint is atomized into a spray of satisfactory size, quality and delivery rate for industrial spray painting. Airless spray painting eliminated the paint-wasting blast of compressed air.

Electrophoretic painting eliminates the spray gun altogether. Articles to be painted are moved on a conveyor into and through a large bath including resin coating material particles suspended in a liquid. While immersed in the bath, an electrical field is created between the articles and an electrode grid in the tank or the tank itself. The electrical field causes the movement of resin coating material particles toward and onto the surface of the articles to provide a thin film of resin coating material on the article.

Powder painting also eliminates the conventional air spray gun. The powder is dry, finely ground particles having a particle size of up to 200 microns in diameter. The powder is entrained in an air stream and is delivered from a fluidized powder reservoir to an electrostatic powder spray gun which imparts a high voltage electrostatic charge to the individual powder particles. The powder particles are deposited upon an article at a particle attracting potential through the action of electrostatic forces and the entraining air. The powder particles build up to a deposit which clings to the article surface by virtue of the electrostatic forces associated with the deposited charged particles and the article at a particle attracting potential.

Neither electrostatic spray painting, airless spray painting, electrostatic powder painting nor electrophoretic painting eliminated the cumbersome and expensive high temperature bake oven necessary to provide an acceptable smooth and substantially continuous, decorative and protective finish.

The present invention provides an apparatus for and a method of providing an article with a smooth and substantially continuous, decorative and protective finish which minimizes pollution of the environment and either eliminates the need for a bake oven to cure the finish or minimizes the length of time the spray coated article is subjected to an elevated temperature. However, before describing my apparatus and method, an explanation of the quality requirements for industrial product finishes will prove helpful to a better understanding of my invention.

To adequately protect and decorate the surface of an article with a substantially continuous dry paint film, the surface must be covered with a film of one to two mils thickness. Dry films of lesser thickness fail to cover metal surface imperfections and lack resistance to wear and impact. Dry films of greater thickness add unnecessary cost of finishing and often are less resistant to chipping, cracking and impact than thinner films.

To form dry films without sags, runs or unacceptable surface roughness, the spray gun should atomize the paint into liquid particles whose maximum size does not exceed a given diameter and, preferably, most particles will have a lesser diameter. One method of determining whether atomization is suitable as to particle size is to measure the diameter of spots formed by spray particles impringing on an appropriate target under controlled conditions. Conditions which have been used in practice involve passing a 4 inch by 6 inch flat target through the spray longitudinally of its longest dimension with one face in a plane perpendicular to the spray axis and at a distance of about 12 inches from the spray source with sufficient rapidity that the exposed face of the target is substantially free of overlapping spots. If the average diameter of the ten largest spots on the target (hereinafter called the "spray spot size") is less than about 15 mils, the spray is capable of producing finishes of high quality although where finish requirements are less stringent sprays producing a spray spot size of 20 mils may be satisfactory. Hereinafter, where reference is made to the spray spot size of spray particles, it is to be understood that the size referred to is the spray spot size determined under the conditions just indicated.

Generally speaking, articles require two successive coats of paint. For example, U.S. made motor car bodies receive first a prime coat of relatively inexpensive rust inhibiting materials. This coat is dried and sanded smooth and then the body is spray finished with a solvent based acrylic paint. The finish coat is applied by conventional compressed air guns or the newer electrostatic guns. The guns are maintained 8 to 12 inches from the car body and spray several hundred to a thousand cubic centimeters of paint per minute. The guns form the atomized paint particles into a pattern which deposits onto the car body an elongated elliptical pattern about 18 inches long and 6 inches wide at its greatest width. Usually, the paint as fed to the gun has a viscosity of about 20 seconds measured in a Ford No. 4 cup and includes 50% by weight volatile hydrocarbon solvents which eventually evaporate into the atmosphere during spraying, flash-off and baking. The remaining 50% solids consist essentially of acrylic resin and necessary pigments and/or metallic flakes which impart the desired color and lustre to the final finish. Although acrylic resins are widely used to coat motor car bodies other resins such as alkyd, melamine and polyester resins are also used to coat articles.

Most American car bodies move through the spray painting booth and subsequently through the bake oven at speeds of about 15 feet per minute. Spray painting takes about a minute per body but baking requires about 25 minutes. The baking of acrylic paints requires temperatures in the range of 400°F.

The manufacturers of resins have known that resins could be converted into a solid film by the addition of suitable chemicals, rather than by baking at elevated temperatures. Conversion, known technically as polymerization, of a resin from a relatively stable liquid state to a very stable solid state generally requires the addition of a catalyst to the resin. Catalysts are chemicals whose addition in relatively small amounts to the resin speed up or promote the polymerization of the resin. Catalysts have not been widely used to promote the polymerization of resins employed in thin film applications because of, among other things, their relatively short pot life. "Pot life" as used herein means the length of time within which a mixture of resin and catalyst will become unsprayable because of the effect on viscosity caused by rapid polymerization.

Thus catalyzed plural component materials have not been used for the spray coating of articles with thin films because of difficulties in rapidly and consistently mixing the components, in purging the mixing chamber upon termination of spraying, and in the proper atomization of the catalyzed materials particularly during initiation and termination of spraying.

The present invention includes a gun for spraying catalyzed plural component coating material which provides an article with a substantially uniform continuous thin film about one to 2 mils thick while avoiding the problems posed by the short pot life of such material. One form of spray gun embodying the present invention includes a gun body, first and second means to connect the gun body with separate sources of first and second components to be mixed in and sprayed from the gun, means to connect the gun body with a source of compressed air, means for directing a flow of compressed air from the gun body, an ejection orifice for the plural component material connected with the first and second means and cooperatively positioned with respect to said means for directing the flow of compressed air from the gun body to form a spray of plural component material, means for mixing the first and second components in the connection between the first and second means of said body and the ejection orifice, means to connect the source of compressed air to the mixing means, said mixing means being movably fastened to the body between a first position where the first and second components are permitted to flow through the mixing means to the ejection orifice and a second position where flow of the first and second components is blocked and a flow of compressed air is permitted to flow through the mixing means and ejection orifice, said mixing means being movably fastened to said body so that its movement does not move the ejection orifice for the mixed components either longitudinally along its axis or laterally with respect to the means for directing the flow of compressed air, and actuation means for moving the mixing means between its first and second positions.

One form of the method of the present invention for spraying plural component material includes the steps of introducing the components of a material to be sprayed into a mixing chamber, mixing the components in the chamber, ejecting the mixed material from an orifice in the chamber, directing compressed air at the material ejected from said orifice to form the ejected material into a spray of the material, cutting off the introduction of components into the chamber without changing the position of said orifice to terminate the spraying of the material without detoriorating the quality of the spray, and immediately following said cutting off of the components into the chamber purging the residue of the components from the chamber by a flow of compressed air through said chamber.

The apparatus of the present invention includes a plurality of compressed air jets directed toward the ejected plural component material so as to atomize the material into a spray of liquid particles having such size and shape to provide a high quality finish on the article. It is important that the orifice from which the plural component material is ejected not move axially or laterally with respect to the jets of compressed air at any time during atomization or during the purging of plural component material from the mixing chamber. In the event this ejecting orifice moves axially or laterally from its cooperative association with the jets of air, the liquid will not be atomized into the desired particle size and the desired spray pattern will not be formed, resulting in large droplets and/or uneven particle distribution which can seriously mar the final finish on the article. It is also an important feature of our invention that the compressed air jets continue during the purging of the plural component material from the mixing chamber so that such purged material is atomized and directed towards the articles in such condition that the purged material does not mar the finish on the article.

Other methods and apparatus related to dispensing plural component material mixed internally of the apparatus and purging the apparatus of mixed plural component material include those in U.S. Pat. Nos. 3,122,326; 3,263,928; 3,291,396; 3,232,540; 3,375,978; 3,176,922; 3,437,273; 3,504,855; 3,708,123 and German Gebrauchsmuster No. G 70 06 182.4.

The appended Figures of the drawing are inteneded to illustrate apparatus embodying the concepts of the present invention constructed to function in the most advantageous mode presently devised for the practical application of the principals involved in the hereinafter described invention. In the drawing.

Figure 1:
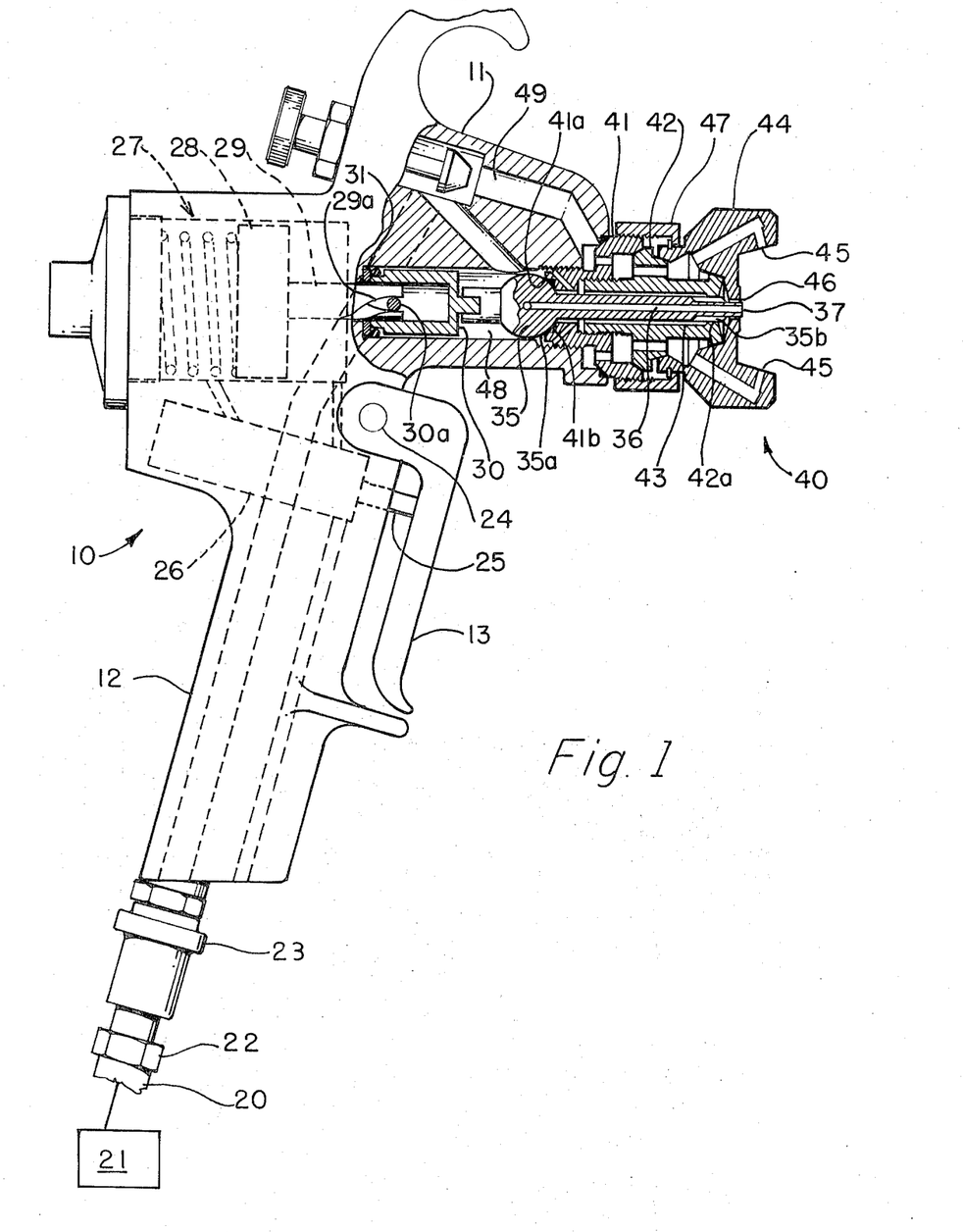
FIG. 1 is a side view, partially in cross section and with portions in dotted lines, of apparatus embodying the concepts of the present invention.
Figure 2:
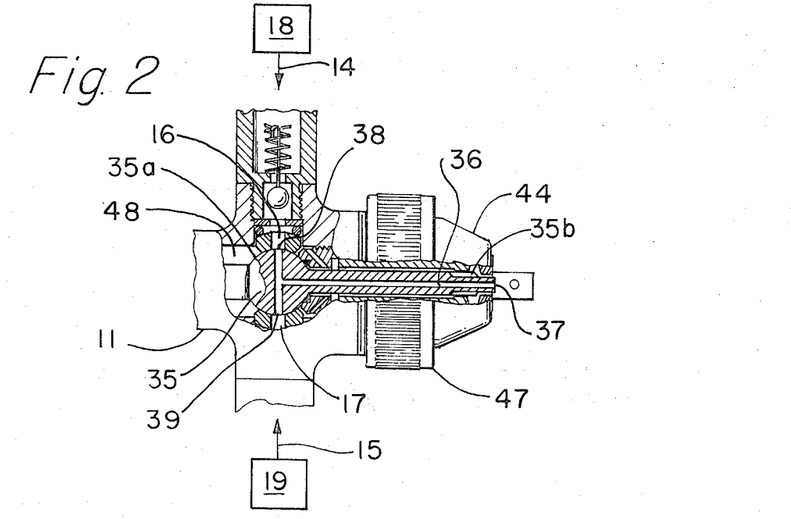
FIG. 2 is an enlarged cross sectional and partially diagrammatic view of the rotatable chamber and the orifice of the apparatus shown in FIG. 1, the chamber and the orifice being in the mix and material eject position.
Figure 3:
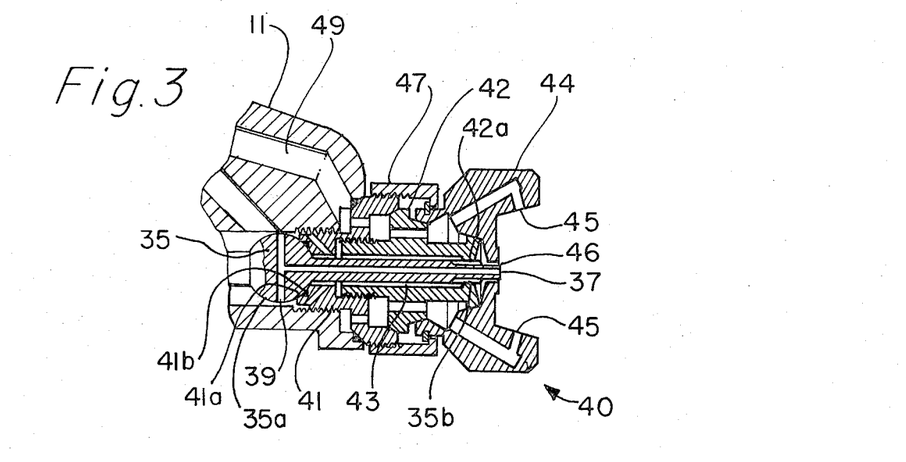
FIG. 3 is an enlarged partial cross sectional view of the chamber and the orifice of the apparatus shown in FIG. 1, the chamber and the orifice being in the material removal or purge position.
Figure 4:
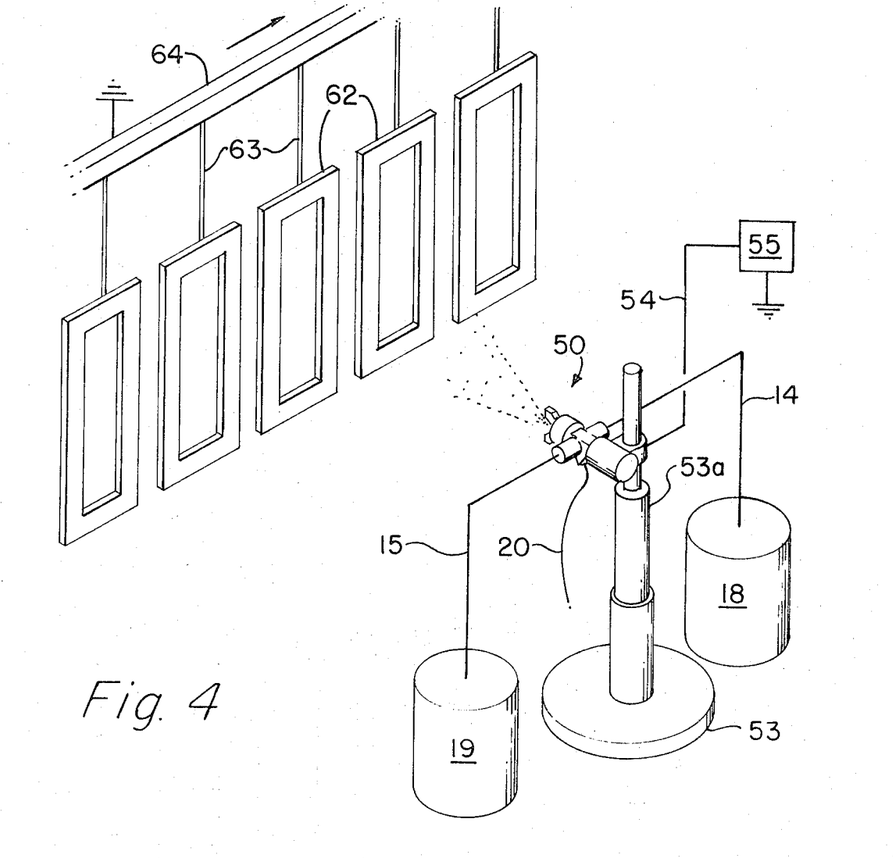
FIG. 4 is an isometric view, partially diagrammatic, of an automated electrostatic spray coating system which embodies concepts of the present invention.
Figure 5:
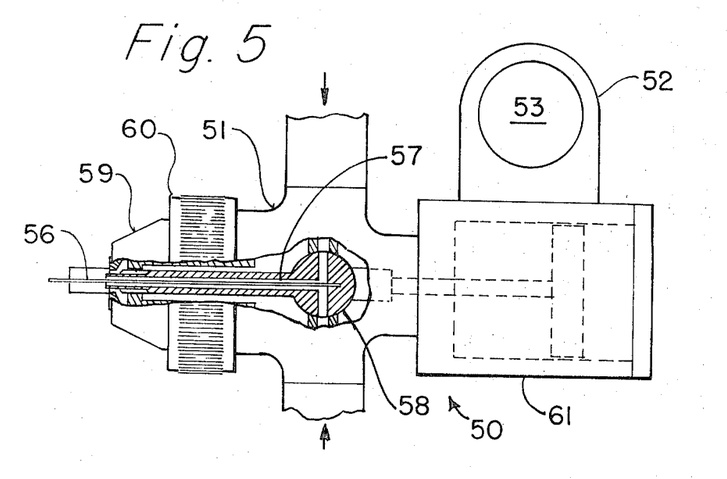
FIG. 5 is an enlarged plan view, partially in cross section, of the spray gun shown in FIG. 4.

Referring now to FIGS. 1, 2 and 3 of the drawing, a hand spray gun incorporating the concepts of the present invention is indicated by reference number 10. The hand gun 10 includes a main gun body 11, a handle 12 extending from the body at an angle thereto, and a trigger 13. The body 11, the handle 12 and the trigger 13, as well as appropriate other parts of the gun 10, are fabricated from any suitable wear resistant material that is chemically inert with respect to components to be mixed and to the plural component material which results from the components being mixed. Suitable materials include aluminum, aluminum alloys, and steel and copper alloys, or plastics such as acetal resin, epoxy, glass filled epoxy, nylon and glass filled nylon.

A first component, component A, and a second component, component B, of a plural component material flow into inlet ports 16 and 17, respectively, located in the sides of gun body 11 as illustrated in FIG. 2. The inlet ports 16 and 17 are fabricated from suitable materials chemically inert to components A and B, such as steel, steel alloys, ceramincs and plastics. Conduit 14 connects gun 10 to reservoir 18 containing, for example, component A. Conduit 15 connects gun 10 to a reservoir 19 containing, for example, component B.

The plural component material sprayed from the gun 10 may be any catalyzed plural component material capable of being atomized into particles having a spray spot size of 15 mils or less and which can be air dried to form a dried film which permits light handling within about 30 minutes. For the purpose of illustration, a suitable catalyzed plural component material is a two component polyurethane resin system containing a prepolymer or adduct having free isocyanate groups capable of forming useful films by combining with a catalyst, accelerator or cross-linking agent such as a monomeric polyol or polyamine. Reservoir 18 contains component A which is suitable isocyanate-terminated polymer and reservoir 19 contains component B which is a suitable polyfunctional reactive amine and polyol. Curing of the polyurethane is accomplished by mixing the prepolymer with polyfunctional reactive amines and polyols.

Hose 20 supplies compressed air or other gas from a source 21 to the spray gun 10 through a suitable regulating valve (not shown) by connection of the hose to coupling 22. A slidable on-off valve 23 controls the supply of compressed air to gun 10. Compressed air is used to atomize the mixed component material ejected from gun 10, and to shape the spray pattern projected from the gun. Further, compressed air is used to purge the gun 10 of substantially all the residue of components A and B upon termination of their flow to the gun.

As shown in FIG. 1, trigger 13 of suitable length is pivotally connected to gun 10. The trigger 13 is pivoted about an axis provided by bolt 24 used to retain the trigger on the gun.

Pivotal displacement of trigger 13 toward handle 12 causes the trigger to engage with and depress valve plunger 25 which in turn activates air valve 26. The activated air valve 26 allows air to flow to the front chamber of air actuated means 27 located at the rear of the main body 11 of gun 10. The air actuated means 27 includes a double acting piston 28 whose piston rod 29 fits slidably within the hollow end of a rotatable cylinder 30. The linkage of a pin 30a mounted in cylinder 30 to a helical groove 29a in rod 29 transforms axial movement of the piston rod into rotation of cylinder 30 about its axis.

The elevated air pressure acting against the piston 28 causes piston rod 29 to move rearward and this in turn causes cylinder 30 to rotate from its normal position. Likewise, when compressed air is fed to the rear chamber of air activated means 27 by the release of trigger 13, the piston rod moves forwardly thus causing rotation of cylinder 30 in the opposite direction.

A flange at the forwardmost end of cylinder 30 is received in a slot at the rear of rotatable member 35. Member 35 has formed therein mixing chamber 36 and orifice 37. The rotatable member 35 shown in the drawings has its outer surface 35a as a surface of revolution about the axis of chamber 36 and it may be fabricated from any suitable material such as steel alloy. Rotation of cylinder 30 causes a like rotation of member 35 and hence rotation of mixing chamber 36 and orifice 37. The rotation of member 35 allows the introduction of components A and B into the mixing chamber 36 through apertures 38 and 39. It should be noted that the orifice 37 does not move forwardly, rearwardly or laterally with respect to the front face of the gun 10 prior to, during or subsequent to rotation of member 35. This is important to achieve at all times the required atomization of the coating material.

In gun 10 liquid orifice 37 is retained in cooperative association with compressed air atomizing means 40 by bearing surfaces 41a and 42a of the gun body. Referring to FIGS. 2 and 3, outer surface 35a of member 35 includes a spherical and cylindrical surface of revolution. A thrust bearing 31 urges member 35 forwardly through cylinder 30. Outer surface 35a is thus maintained in contact with bearing surface 41a of the gun body which conformingly engages it, restricting the movement of member 35 along its axis of rotation. Bearing surface 41a includes a portion 41b having high lubricity to reduce friction and increase the rotational freedom of member 35. Bearing surface 42a conformingly engages the cylindrical outer surface of member 35 adjacent the liquid orifice 37 restricting the movement of member 35 laterally with respect to orifices 45 and 46 of compressed air atomizing means 40. Grooves 35b in outer surface 35a of member 35 permit air flow past bearing surface 42a.

The rotatable member 35 is located within the body of gun 10. Member 35 includes orifice 37 from which the material is ejected, mixing chamber 36 in which the mixing of components A and B is accomplished, a plurality of inlet openings or apertures 38 and 39 communicating with the mixing chamber 36 and adapted to be connected either to reservoirs 18 and 19 of components A and B of the plural component material or to the compressed air source 21 (as shown in FIG. 3) to purge the mixing chamber.

In the drawing the cross sectional dimension of mixing chamber 36 and orifice 37 are shown as round, and the cross sectional dimensions of the mixing chamber and orfice are illustrated as being substantially the same. It may well be that under certain operating circumstances, orifice 37 will have a diameter or a cross sectional configuration different from that of the mixing chamber 36.

Component A is introduced into the mixing chamber 36 through aperture 38 and inlet port 16 which includes a suitable check valve as shown in FIG. 2. Component B is introduced into the mixing 36 through aperture 39 and inlet port 17 spaced about 180 degrees from inlet port 16. It is to be understood that a plurality of small apertures may be substituted for each of the larger apertures 38 and 39. The introduction of components A and B tangentially with respect to the mixing chamber 36 appears to result in turbulence sufficient to effect appropriate mixing and agitation of the components. However, it is to be understood that apertures 38 and 39 may intersect the mixing chamber 36 chordally and may be spaced rearwardly of the orifice 37 at unequal distances so long as appropriate mixing and agitation of the components is realized.

Front end members 41 and 42 form the front end of gun 10, close the front of main gun body 11 and also provide bearing surfaces to position member 35 as previously described. Front end members 41 and 42 are suitably attached to the body as by threadedly engaging the body, and may be fabricated from the same material as main body 11. Front end members 41 and 42 have an interior surface which together with the outer surface of the front portion of member 35 provides an air passage 43 to the front of the gun.

Air cap 44 includes a pair of compressed air emitting orifices 45 formed in oppositely spaced ears and one or more air emitting orifices 46 surrounding liquid orifice 37. Air cap 44 is affixed to the gun 10 by a threaded retaining ring 47. Air orifices 46 direct compressed air toward the plural component material emerging from orifice 37 so as to atomize the ejected material into particles having a particle size such as to provide a quality finish on the article, preferably with a spray spot size of 15 mils or less. Further, the compressed air issuing from orifices 45 is used to shape the atomized particles into an elliptical or fan-shaped spray pattern. A suitable line pressure in hose 20 for the air used to atomize the plural component material ejected from orifice 37 is from about 50 to 100 pounds per square inch.

Referring to FIGS. 1 and 3, with trigger 13 in its non-spraying or purging position, apertures 38 and 39 are positioned such that components A and B are prevented from being introduced into mixing chamber 36. Apertures 38 and 39 of member 35 are now in communication with compressed air source 21 through air chamber 48 formed in body 11 about the rear end of member 35. Purging air under suitable pressure supplied through hose 20 flows from air chamber 48, through apertures 38 and 39 and out orifice 37. Such position of the apertures is best shown in FIG. 3.

With the hereinbefore disclosure in mind and by continued reference to the drawing, the following description of the operation of plural component spray gun 10 is given:

An operator squeezes trigger 13, air flows to the front chamber of air actuated means 27 retracting piston 28 and thereby rotating member 35 and its mixing chamber 36. Member 35 including its mixing chamber 36 is rotated from its purging position as shown in FIG. 3 to the spraying position as shown in FIG. 2. Apertures 38 and 39 are now substantially aligned with liquid component supply conduits 14 and 15 respectively. Components A and B are introduced tangentially to the mixing chamber 36 through apertures 38 and 39 respectively. A rapidly swirling mass of materials is provided within the mixing chamber 36 so that components A and B are thoroughly mixed. Compressed air flowing from the openings in air cap 44 interact with the mixture of components A and B ejected from the orifice 37 to atomize the mixture into particles with a spray spot size of 15 mils or less and to shape the spray of component material particles. The air is supplied to air cap 44 from source 21 through passageways 43 and 49.

Discontinuing the spraying operation is accomplished by allowing trigger 13 to pivotally return to its normal or purging position by the operator releasing the pressure applied to the trigger. Release of the trigger causes piston 28 to move forwardly thereby rotating member 35 with its apertures 38 and 39, chamber 36, and orifice 37. Apertures 38 and 39 are slidably disassociated from conduits 14 and 15 and hence from their respective component reservoirs 18 and 19. As member 35 moves, apertures 38 and 39 move until they are fully exposed to the compressed air chamber 48. A substantial portion of the air flowing from source 21 is now directed from chamber 48 through apertures 38 and 39 and chamber 36 and orifice 37 thereby purging the apertures, mixing chamber and orifice of all residue of component material and preventing harmful clogging of the spray gun.

As can best be seen from FIG. 3, the movement of member 35 into purging position by no means terminates the flow of compressed air from the openings in air cap 44. This is an important feature since it assures that the purged residue, like the plural component material ejected from orifice 37 during normal spraying, is atomized into particles of the desired 15 mil spray spot size and deposited on the article without deteriorating its finish.

When gun 10 is not to be used for an extended period of time, on-off valve 23 should be moved to the off position to terminate the flow of compressed air to the gun.

While compressed air gun 10 shown in FIGS. 1–3 of the drawing is a hand held or manually operable gun, the concepts of our invention may likewise be embodied in a remotely controlled or automatic spray gun. Moreover, although spray gun 10 is a non-electrostatic gun, the invention may also be used with an electrostatic gun. FIGS. 4 and 5 show an automatic electrostatic spray coating system embodying concepts of the present invention.

In FIGS. 4 and 5 the automatic electrostatic gun is indicated by reference number 50. The gun includes a gun body 51 and a support flange 52 extending from the body. The gun 50 is mounted on a stand 53. The gun body 51 and the flange 52 are fabricated from any suitable material but in the embodiment shown the material is aluminum alloy. The stand 53 has its upper portion 53*a* made of electrically insulating material such as nylon.

The construction of gun 50 and its connections to compressed air and coating components are substantially similar to gun 10 previously described except for four differences. First, gun body 51 is connected by means of high voltage cable 54 to a source of high voltage 55 so that the gun and all conducting parts connected to the gun are at the desired high voltage ranging from 30 to 120 kilovolts.

Secondly, a needle-like metal electrode 56 is mounted axially of the mixing chamber 57 in the rotatable member 58. Electrode 56 projects from the rear of chamber 57 and out of the liquid orifice to terminate about a half inch beyond the orifice.

Thirdly, the front end of gun 50 is covered with insulating material by making air cap 59 and retaining ring 60 of an insulating material such as glass filled nylon. Thus, except for the front face of member 58 surrounding the liquid orifice and electrode 56, all portions of the front portion of gun 50 exposed to the atmosphere are of insulating material.

Fourthly, gun 50 is operated, that is turned on and off, remotely rather than by hand. Thus the rotation of member 58 is accomplished by its connection to a remotely controlled double acting air cylinder 61 or other known remotely controllable means.

Gun 50 mounted on insulating stand 53 is spaced about 12 inches from the metal articles 62 to be spray coated hung by hangers 63 from conveyor 64. The articles are grounded through the conveyor. The gun is maintained at high voltage by its connection to cable 54 and high voltage source 55. Thus a high electrostatic field is established between the end of electrode 56 to aid in charging and depositing the liquid particles sprayed from gun 50 as taught in U.S. Pat. No. 3,169,882. Except for its electrostatic charging and depositing effect, the coating system shown in FIG. 4 operates essentially as the system previously described and shown in FIGS. 1–3.

Thus the invention illustrated and described above includes electrostatic and non-electrostatic compressed air spray guns with a member for mixing the components of a multi-component material movably fastened to the gun body. An actuator which can include either a trigger or a compressed air cylinder moves the mixing member to a spraying position where the components are permitted to flow into and through an inner mixing chamber by aligning apertures in the member with means to deliver the components to the outer surface of the member. The components are thus automatically mixed and sprayed by operation of the actuator.

The mixing member is returned to a non-spraying position automatically by a biasing means such as the spring in the air cylinder when the actuator is deenergized, for example, when the trigger of the hand gun is released. In this second position the flow of components from their respective delivery means is blocked by the outer surface of the mixing chamber, whose apertures are then in communication with means in the gun body to deliver compressed air to the apertures, thus effecting simultaneous termination of spraying and purging and cleaning of the apertures, the chamber and the liquid orifice.

The movement of the mixing means does not move the liquid orifice longitudinally along its axis or laterally with respect to the compressed air atomizing means, and their cooperative association is thus maintained during spraying and cleaning of the gun. In the guns illustrated the mixing member has an outer surface shaped as a surface of revolution. The outer surface of revolution decreases in diameter longitudinally along its axis of its rotation like the spherical portion of member 35 illustrated. The gun body conformingly engages this outer surface to provide a bearing surface that prevents movement of liquid orifice from its cooperative association with the compressed air atomizing means at the front of the gun body.

The following examples of spraying an article are given to further illustrate the present invention. It is to be understood that substrates other than metal can be sprayed using the apparatus and method disclosed. Such other substrates include, but are not limited to wood, hardboard, epoxy, polyester reinforced with glass fibers, and masonry with or without a primer coat.

EXAMPLE 1

A steel metal surface to be sprayed is clean, firm and free of dust, wax, grease, oil, rust and other foreign matter. Preferably, the metal surface is sandblasted and all residue of the sandblasting dust is removed with toluene or a vapor degreaser.

Component A is a mixture of materials made by Sherwin-Williams Co. of Cleveland, Ohio. About 300 parts by volume resin sold under the name POLANE and carrying identification number 179825 (16) is mixed with about 117 parts by volume of a reducer carrying identification number R7K69. Component B is unmixed and unreduced V66V28 catalyst sold by Sherwin-Williams Co. of Cleveland, Ohio. The components are introduced to the gun 10 at a flow rate of 417 cubic centimeters per minute of component A and 50 cubic centimeters per minute of component B. The line pressure for component A is about 70 pounds per square inch and the line pressure for component B is about 60 pounds per square inch. The atomizing air line pressure is about 90 pounds per square inch in order to provide a spray spot size of less than 15 mils. The gun 10 is held about 10 to 15 inches away from the substrate during ejection and atomization of the material from the gun. The pass of the gun is lapped about halfway. After about 30 minutes, the surface of the polyurethane film is sufficiently dry to permit light handling. After setting overnight the film is essentially hard. The resultant film is about one mil thick, appears to be substantially continuous, and has the toughness, abrasion resistance, impact resistance, chemical resistance and solvent resistance required of high quality finishes.

It is to be understood that the time to produce a hard film can be reduced to 30 minutes by subjecting the film to an elevated temperature of about 180°F.

EXAMPLE 2

A steel metal surface to be sprayed is clean, firm and free of dust, wax, grease, oil, rust and other foreign matter. Preferably, the metal surface is sandblasted and all residue of the sandblasting dust is removed with toluene or a vapor degreaser.

Component A is a mixture of materials made by Sherwin-Williams Co. of Cleveland, Ohio. About 600 parts by volume resin sold under the name POLANE and carrying identification number 179825 (16) is mixed in container 18 with about 206 parts of reducer identification number R7K69. Component B is a mixture of about 500 parts by volume V66V27 catalyst and about 140 parts by volume R 7KT 39 reducer each sold by Sherwin-Williams Co. of Cleveland, Ohio. The components are introduced to the gun 10 at a flow rate of 403 cubic centimeters per minute of component A and 64 cubic centimeters per minute of component B. The line pressure for component A is about 70 pounds per square inch and the line pressure for component B is about 60 pounds per square inch. The atomizing air line pressure is about 90 pounds per square inch. The gun 10 is held about 10 to 15 inches away from the substrate during ejection and atomization of the material from the gun. The pass of the gun is lapped about halfway. After about 30 minutes, the surface of polyurethane film is substantially dry to permit light handling. After setting overnight the film is essentially hard. The resultant film is uniformly about one mil thick, and has the toughness, abrasion resistance, impact resistance, chemical resistance and solvent resistance of a high quality finish.

While the invention is illustrated and described in its presently preferred embodiment, it will be understood that modification and variations may be effected without departing from the scope of the novel concepts of this invention as set forth in the appended claims.

We claim:

1. In a compressed air gun for spraying plural component material comprising a gun body, first and second means to connect the gun body with separate sources of first and second components to be mixed in and sprayed from the gun, means to connect the gun body with a source of compressed air, means for directing a flow of compressed air from the gun body, and an ejection orifice for the plural component material connected with the first and second means and cooperatively positioned with respect to said means for directing the flow of compressed air from the gun body to form a spray of plural component material, the improvement comprising means for mixing the first and second components in the connection between the first and second means of said body and the ejection orifice, means to connect the source of compressed air to the mixing means, said mixing means being movably fastened to the body between a first position where the first and second components are permitted to flow through the mixing means to the ejection orifice and a second position where flow of the first and second components is blocked and a flow of compressed air is permitted to flow through the mixing means and ejection orifice, said mixing means being movably fastened to said body so that its movement does not move the ejection orifice for the mixed components either longitudinally along its axis or laterally with respect to the means for directing the flow of compressed air, and actuation means for moving the mixing means between its first and second positions.

2. The compressed air gun of claim 1, wherein the means for directing a flow of compressed air from the gun body is formed of insulating material and the mixing means includes an elongated needle-like electrode about which the components are mixed maintained in position with respect to the liquid orifice and the means for directing a flow of compressed air from the gun to electrostatically charge the spray of plural component material.

3. A spray gun for plural component coating material with a combined valve, chamber and liquid orifice comprising a member having an outer surface shaped about an axis as a surface of revolution, an inner mixing chamber in which first and second liquid components of the coating material are mixed, two apertures between the inner chamber and the outer surface, and a liquid orifice at its front communicating with said inner chamber from which the mixed components are ejected;

a spray gun body with means to deliver separately to the outer surface of said member from separate sources of supply: (1) the first liquid component to be mixed and sprayed, (2) the second liquid component to be mixed and sprayed, and (3) compressed air for purging and cleaning the inner chamber;

the spray gun body including compressed air atomizing means at its front end cooperatively associated with the liquid orifice of the member;

the member engaging the spray gun body at its outer surface and having two positions of operation angularly displaced about the axis of the outer surface, a spraying position in which the two apertures of the member are aligned with the means delivering the first and second liquid components to the outer surface and in which the outer surface of the member blocks the means delivering compressed air, and a non-spraying position in which the two apertures are aligned with the means delivering compressed air to the outer surface and in which the outer surface blocks the means delivering the first and second liquid components; and an actuator to rotate the member about the axis of its outer surface to effect simultaneous mixing and spraying of the coating material in the spraying position and simultaneous termination of the mixing and spraying of coating material and purging and cleaning of the apertures, chamber and liquid orifice in the non-spraying position.

4. The spray gun of claim 3 wherein the outer surface of revolution of the member decreases in diameter longitudinally along its axis of rotation and the spray gun body conformingly engages the outer surface of the member to provide a bearing surface that prevents movement of the liquid orifice longitudinally along its axis and laterally with respect to the compressed air atomizing means at the front of the spray gun body.

5. The spray gun of claim 3 wherein the outer surface of revolution of the member has a spherical portion and the spray gun body has a spherical portion engaging the outer surface of the member.

6. A compressed air gun for plural component material comprising a gun body, means forming a mixing chamber within said gun body for mixing components of the material just prior to being ejected from the gun, the means being movably fastened within the gun and adapted to be connected within the gun to the components of the material to be mixed and to compressed air, a liquid orifice in communication with said chamber for ejecting the mixed material from the gun, and compressed air means carried by the gun body for atomizing the material ejected from the orifice into a spray of liquid material, means for automatically moving the chamber from a position where components are introduced to the mixing chamber to a position where the introduction of the components to the chamber is terminated and compressed air is introduced to the chamber to purge and clean it without moving the liquid orifice out of cooperative association with the compressed air means thereby atomizing the mixed material purged from the gun during cleaning.

7. The spray gun of claim 6, wherein the means for atomizing the material into a spray includes a plurality of orifices directing compressed air in such manner as to form the spray of liquid material into an elliptical spray pattern.

8. The spray gun of claim 6, wherein the means forming a mixing chamber is rotatable and includes an outer surface of revolution and the gun body includes bearing surfaces conformingly engaging the outer surface of the mixing chamber means to maintain the liquid orifice in cooperative association with the compressed air means.

9. The spray gun of claim 6 wherein the means forming the mixing chamber includes apertures adapted to be connected to the components of the material to be mixed when in one position and adapted to be connected to the compressed air for purging the residue from the chamber when in a second position.

10. The spray gun of claim 6 wherein the gun body includes a handle and a trigger adjacent the handle to move the means forming a mixing chamber, the means for automatically moving the chamber storing energy from actuation of the trigger to be used upon release of the trigger to terminate spraying and to introduce compressed air to the mixing chamber and liquid orifice to purge and clean them.

11. The method of forming a thin, solid homogeneous coating over the surface of an article including the steps of supplying liquid component A to a mixing chamber within a compressed air atomizing gun, supplying liquid component B to said mixing chamber, mixing said components A and B within said chamber, ejecting the mixture of components A and B from said gun as a liquid stream, atomizing said liquid stream into a spray of finely divided liquid particles by the action of compressed air issuing from said gun, depositing said spray of liquid particles substantially uniformly over the surface of the article, converting the deposited liquid spray into a solid homogeneous coating having a substantially uniform thickness of not less than one nor more than 2 mils, energy for said conversion being supplied by the reaction of components A and B with each other, and terminating the supply of components A and B to the mixing chamber and at the same time purging said chamber of liquid components by a flow of compressed air therethrough.

12. A method of spraying liquid material which includes the steps of introducing two components of the material to be sprayed into a movable mixing chamber, mixing the components in the chamber, ejecting the mixed material from an orifice in the chamber, directing compressed air at the material ejected from said orifice to form the ejected material into a spray of the material, and moving the chamber to cut off the introduction of components into the chamber without changing the position of said orifice thereby terminating the spraying of the material without deteriorating the quality of the spray.

13. A method of spraying liquid material which includes the steps of introducing two components of the material to be sprayed into a mixing chamber, mixing the components in the chamber, directing compressed air at the material ejected from said orifice to form the ejected material into a spray of the material, cutting off the introduction of components into the chamber without changing the position of said orifice to terminate the spraying of the material without deteriorating the quality of the spray, and immediately following said cutting off of the components into the chamber purging the residue of the components from the chamber by a flow of compressed air through said chamber.

14. The method of claim 13 including the step of electrostatically charging the spray of material.

15. A compressed air gun for spraying plural component liquid material capable of connection to separate supplies of the liquid components of the plural component material comprising an atomizer having means forming a mixing chamber for the liquid components and separate apertures for introducing each of the liquid components into the mixing chamber and an orifice to emit the mixed plural component liquid material and having means to emit compressed air cooperatively positioned with respect to the plural component emission orifice to form a spray of plural component material, a gun body carrying said atomizer and means for connecting said atomizer to each of the separate supplies of the liquid components and to a source of compressed air, said means forming a mizing chamber and said means for connecting said atomizer to each of the separate supplies being carried at the front of the gun body and constructed to permit movement relative to each other while maintaining the plural component emission orifice and the means to emit compressed air in their cooperative spray-forming position, and an actuator carried by the gun body to cause relative movement of the means forming the mixing chamber and the means for connecting said atomizer to each of the separate supplies between a first position where each of the separate apertures directly adjoins each of the connecting means and permits flow of the liquid components through the apertures into the mixing chamber, and a second position in which each of the connecting means are blocked and the flow of liquid components is terminated and in which the apertures are positioned in communication with the source of compressed air to direct a flow of air through the apertures, the mixing chamber and the orifice for purging and cleaning.

* * * * *